United States Patent
Lin

(10) Patent No.: US 11,372,173 B2
(45) Date of Patent: Jun. 28, 2022

(54) OPTICAL CONNECTOR

(71) Applicant: Sung-Chi Lin, Myau-Li County (TW)

(72) Inventor: Sung-Chi Lin, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 1 day.

(21) Appl. No.: 17/168,205

(22) Filed: Feb. 5, 2021

(65) Prior Publication Data

US 2021/0263239 A1 Aug. 26, 2021

(30) Foreign Application Priority Data

Feb. 20, 2020 (TW) .................................. 109105449

(51) Int. Cl.
*G02B 6/36* (2006.01)
*G02B 6/38* (2006.01)

(52) U.S. Cl.
CPC .................................. *G02B 6/3887* (2013.01)

(58) Field of Classification Search
CPC .. G02B 6/3887; G02B 6/3893; G02B 6/3878; G02B 6/389; G02B 6/3825; G02B 6/3831; G02B 6/387; G02B 6/3879; G02B 6/3885
See application file for complete search history.

(56) References Cited

U.S. PATENT DOCUMENTS

| | | | | |
|---|---|---|---|---|
| 2016/0216458 A1* | 7/2016 | Shih | ..................... | G02B 6/3871 |
| 2017/0293090 A1* | 10/2017 | Hopper | ................ | G02B 6/3885 |
| 2019/0154922 A1* | 5/2019 | Elenbaas | .............. | G02B 6/3887 |
| 2019/0154930 A1* | 5/2019 | Ho | ........................ | G02B 6/3879 |
| 2019/0243072 A1* | 8/2019 | Takano | ................ | G02B 6/4292 |

* cited by examiner

*Primary Examiner* — Ellen E Kim

(57) ABSTRACT

The present invention provides an optical connector comprising an accommodation base, a terminal module, a cover, and a polarity adjusting portion. The accommodation base comprises an accommodation space communicating with an opening formed at a side of the accommodation base, and at least one terminal accommodation portion for accommodating the terminal module. The cover is arranged on the opening for sealing the opening. The cover further comprises extending covers corresponding to the terminal accommodation portions, respectively. Each extending cover has a first buckle structure. The polarity adjusting portion is rotatably coupled to the terminal accommodation portion. When the polarity adjusting portion is rotated to a predetermined position, a second buckle structure formed on the polarity adjusting portion is coupled to the first buckle structure for positioning the polarity adjusting portion.

12 Claims, 5 Drawing Sheets

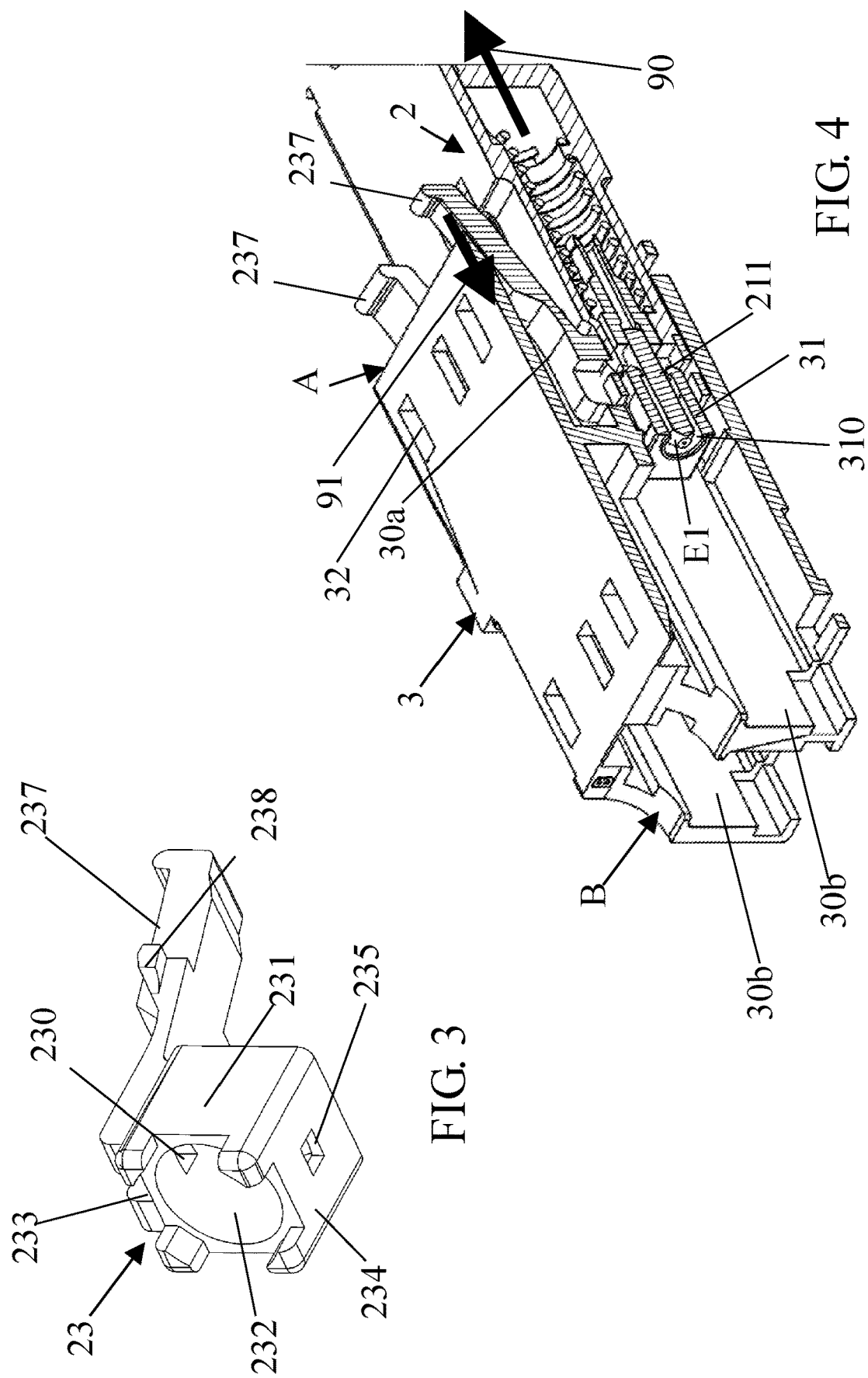

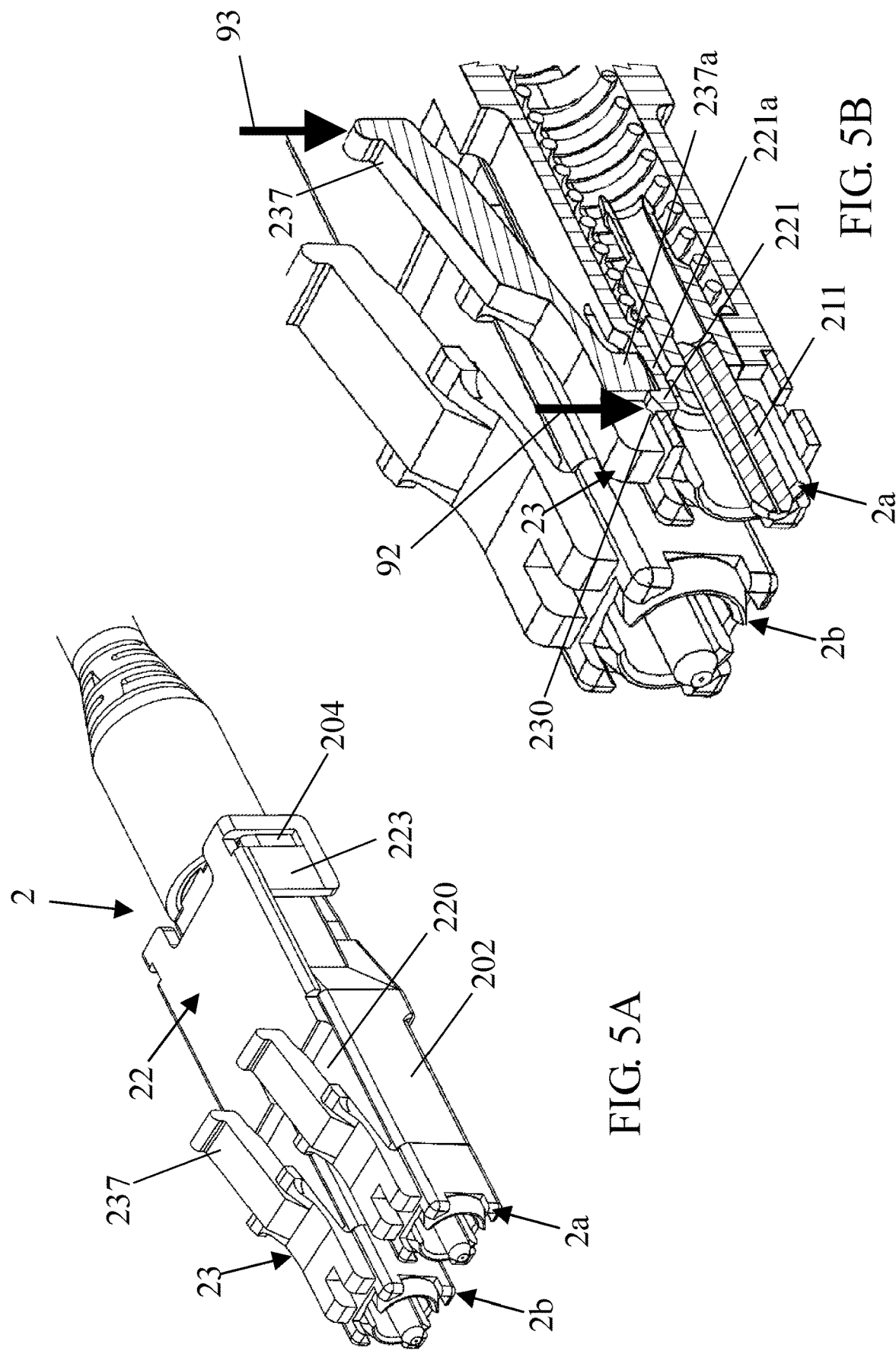

OPTICAL CONNECTOR

CROSS-REFERENCE TO RELATED APPLICATION

This application claims the benefit of Taiwan Patent Application No. 109105449, filed on Feb. 20, 2020, in the Taiwan Intellectual Property Office of the R.O.C, the disclosure of which is incorporated herein in its entirety by reference.

FIELD OF INVENTION

The present invention relates to an optical connector. In particular, it relates to an optical connector which is able to adjusting polarity.

BACKGROUND OF THE INVENTION

Optical fibers have been widely used as signal transmission media in recent years due to the advantages of high frequency bandwidth and low loss. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Among the optical fiber module, in addition to the structure of the receptacle, the design of the optical connector is also very important. There are many types of optical connectors, and different manufacturers have different designs, such as SN connectors, MDC connectors, or LC connectors. When the optical connector is to be connected to the receptacle, the polarity sometimes needs to be changed to adapt to different situations.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector, which has a rotating structure for changing the polarity, so that the optical connector may change the polarity to adapt to the different connectors. In addition, the cover of the optical connector has a double buckle mechanism, which ensures that the cover may effectively generate the covering effect.

The present invention provides an optical connector, which has an integrally formed accommodation base. The purpose of the present invention is to avoid multiple assembly elements to form the accommodation base, and avoid to result in reducing the rigidity of the optical connector due to too many assembly elements.

In one embodiment of the present invention, the present invention provides an optical connector, comprising: an accommodation base, an opening disposed on a side of the accommodation base, which has an accommodation space connected to the opening and has at least one terminal accommodation portion; a terminal module, disposed in the terminal accommodation portion; a cover, disposed on the opening of the accommodation base for closing the opening, the cover having extending covers corresponding to the each terminal accommodation portion, an end of the extending cover having a first buckle structure; and a polarity adjusting portion, rotatably sleeved on a periphery of the terminal accommodation portion, wherein when the polarity adjusting portion rotates to a predetermined position, the second buckle structure on the polarity adjusting portion is connected with the first buckle structure for positioning the polarity adjusting portion.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 3 is a three-dimensional schematic diagram of the polarity adjusting portion in the present invention.

FIG. 4 is a schematic cross-sectional diagram illustrating the combination of the optical connector and the receptacle in the present invention.

FIGS. 5A to 5C are schematic diagrams of the polarity change of the optical connector in the present invention.

DETAILED DESCRIPTION OF THE PREFERRED EMBODIMENTS

Figure 1:
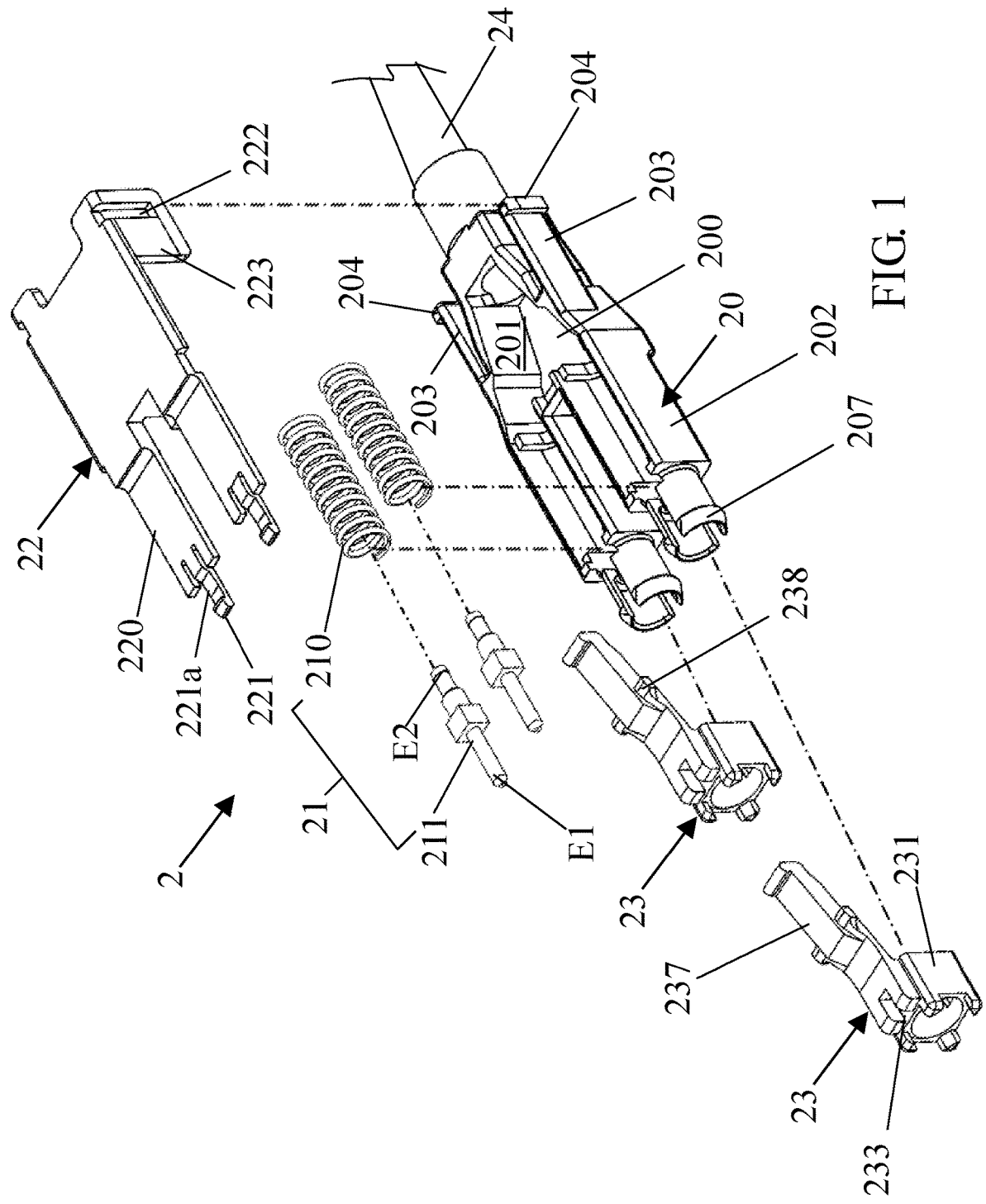
FIG. 1 is a schematic diagram of an embodiment of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector to aid it of skilled in the art in practicing this invention. These embodiments are merely exemplary embodiments and in no way to be considered to limit the scope of the invention in any manner.

Please refer to FIG. 1, which is a schematic diagram of an embodiment of the optical connector in the present invention. In this embodiment, the optical connector 2 includes an accommodation base 20, a terminal module 21, a cover 22 and a polarity adjusting portion 23. A side of the accommodation base 20 has an opening 200, and the accommodation base 20 has an accommodation space 201 connected to the opening 200, and the accommodation base 20 has at least one terminal accommodation portion 202. In this embodiment, the terminal accommodation portions 202 are a pair and are arranged in parallel with each other. The terminal module 21 is arranged in the terminal accommodation portion 202. In this embodiment, the terminal module 21 further includes an elastic member 210 and a terminal member 211. The elastic member 210 is disposed in the terminal accommodation portion 202, and an end of the elastic member 210 is leaned against a wall surface of an end of the terminal accommodation portion 202. The terminal member 211 is disposed in the terminal accommodation portion 202, and an end portion E1 of the terminal member 211 protrudes from the terminal accommodation portion 202, and another end portion E2 of the terminal member 211 penetrates into the elastic member 210. An optical fiber cable 24 is connected to an end of the terminal accommodation portion 202. The terminal member 211 is used for coupling with the optical fiber in the optical fiber cable 24. In this embodiment, the accommodation base 20 is integrally formed by the housing of the accommodation space 201, the housing of the terminal accommodation portion 202, and the end base 207 at the front end of the terminal accommodation portion 202. The purpose of this design is to reduce the number of assembly elements and increase the rigidity of the entire accommodation base 20.

The cover 22 is disposed on the opening 200 of the accommodation base 20 to seal the opening 200. The cover 22 has an extending cover 220 corresponding to each terminal accommodation portion 202, and a first buckle structure 221 is disposed on an end of the extending cover 220. In this embodiment, the first buckle structure 221 is formed on the supporting arm 221a protruding from the end of the extending cover 220. The supporting arm 221a is deformed under an interaction force to change the position of the first buckle structure 221. When the interaction force is removed, the first buckle structure 221 returns to the initial position. In this embodiment, the cover 22, the extending cover 220 and the first buckle structure 221 are integrally formed to reduce the number of assembly elements and increase the rigidity of the entire cover 22. In addition, extending arms 203 are respectively extended from both sides of the accommodation base 20, the end of extending arm 203 has a first engaging structure 204 corresponding to a second engaging structure 222 on both sides of the cover 22. In this embodiment, a plate body 223 is formed on the two sides of the cover 22 corresponding to the first engaging structure 204, and the second engaging structure 222 is formed on the plate body 223. When the cover 22 is set on the accommodation base 20, the first engaging structure 204 is engaged with the second engaging structure 222. In this embodiment, the first engaging structure 204 is a convex cylinder, and the second engaging structure 222 is a slot structure corresponding to the convex cylinder. In another embodiment, the second engaging structure 222 may be a convex cylinder, and the first engaging structure 204 may also be a slot structure corresponding to the convex cylinder. It should be noted that the aspect of the first engaging structure and the second engaging structure are not limited thereto, and those skilled in the art are able to appropriately modify them according to their requirements.

Figure 2B:
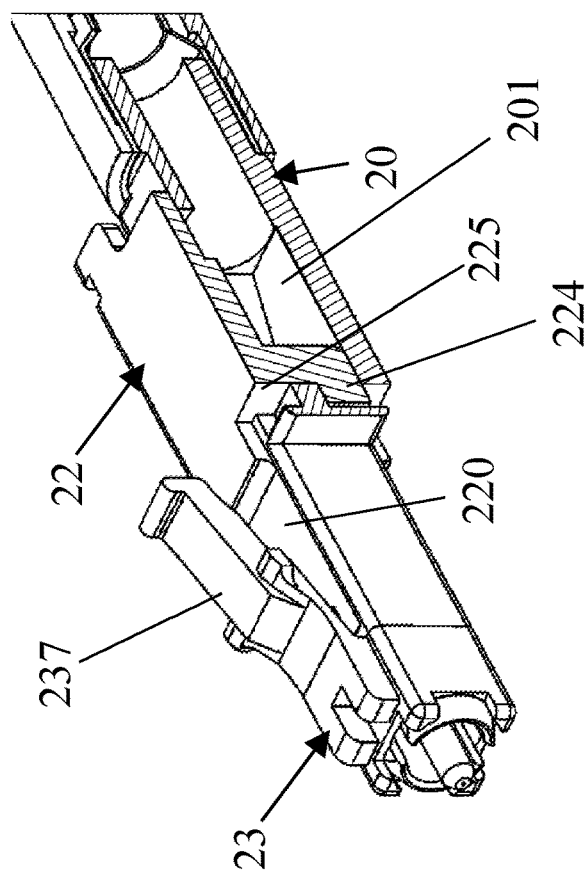
FIGS. 2A and 2B are respectively a three-dimensional schematic diagram of the accommodation base from different perspectives and a partial cross-sectional schematic diagram after the cover and the accommodation base are combined in the present invention.
Figure 2A:
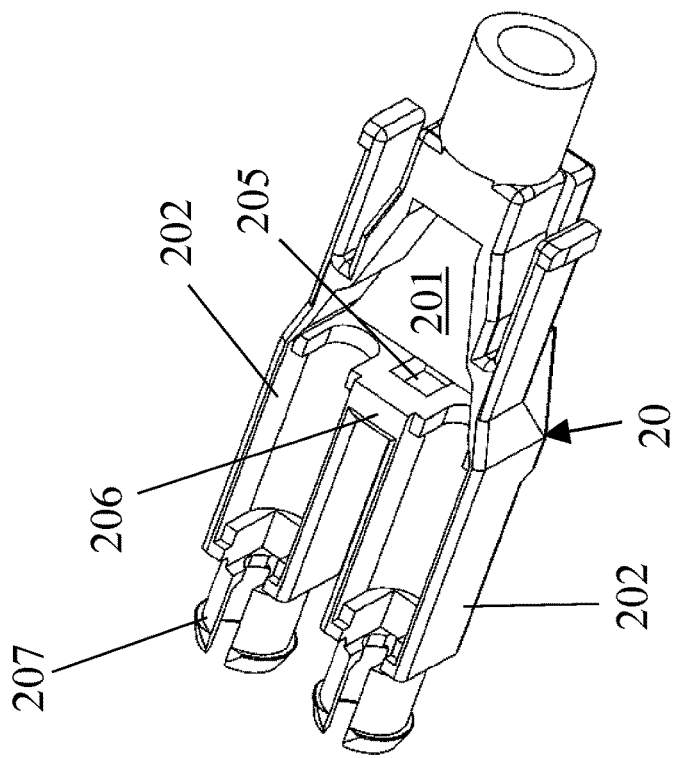

Please refer to FIGS. 2A and 2B, which are respectively a three-dimensional schematic diagram of the accommodation base from different perspectives and a partial cross-sectional schematic diagram after the cover and the accommodation base are combined in the present invention. In this embodiment, there is a double locking mechanism between the cover 22 and the accommodation base 20 to prevent the cover 22 from falling off. The first engaging structure 204 and the second engaging structure 222 are the first locking mechanism between the cover 22 and the accommodation base 20. The second locking mechanism is a first assembly structure 205 in the accommodation base 20 and a second assembly structure 224 on the cover 22. In an embodiment, the cover 22 has a connecting wall 225 between the two extending covers 220 corresponding the terminal accommodation portions 202, and the connecting wall 225 protrudes toward the accommodation space 22, and a second assembly structure 224 is disposed on the connecting wall 225. When the cover 22 is disposed on the opening 200, the second assembly structure 224 is combined with the first assembly structure 205. In this embodiment, a connecting structure 206 is disposed between the two terminal accommodation portions 202, and a first assembly structure 205 is disposed on the connecting structure 206. In one embodiment, the first assembly structure 205 is a groove, and the second assembly structure 224 is a convex structure, which is embedded in the groove to generate a fixing effect when the cover 22 is disposed on the opening 200. In another embodiment, the first assembly structure 205 may be a convex structure, and the second assembly structure 224 may also be a groove.

Please refer to FIG. 1 and FIG. 3, and FIG. 3 is a three-dimensional schematic diagram of the polarity adjusting portion in the present invention. The polarity adjusting portion 23 is rotatably sleeved on a periphery of the terminal accommodation portion 202. When the polarity adjusting portion 23 rotates to a predetermined position, the second buckle structure 230 on the polarity adjusting portion 23 is connected with the first buckle structure 221 for positioning the polarity adjusting portion 23. In this embodiment, the polarity adjusting portion 23 has a frame 231 with a through hole 232 for allowing the end base 207 of the terminal accommodation portion 202 to pass through, so that the first buckle structure 221 located on the end base 207 may buckle with the second buckle structure 230 to achieve the effect of fixing the polarity adjusting portion 23 on the terminal accommodation portion 202. In addition, in one embodiment, the second buckle structure 230 is formed on the surface 233 of the polarity adjusting portion 23, a third buckle structure 235 corresponding to the second buckle structure 230 is formed on the surface 234 corresponding to the surface 233. When the first buckle structure 221 and the second buckle structure 230 are released and the polarity adjusting portion 23 is rotated by a predetermined angle, which is 180 degrees in this embodiment, the third buckle structure 235 rotates to a position corresponding to the first buckle structure 221 and buckles with the first buckle structure 221. In this embodiment, a pressing rod 237 is further formed on the surface 233 of the polarity adjusting portion 23, and the deformation of the supporting arm 221a of the first buckle structure 221 can be controlled by the pressing rod 237. Positioning structures 238 are disposed on both sides of the pressing rod 237 to combine with the positioning holes 32 on the receptacle 3 shown in FIG. 4 to generate the effect of positioning the optical connector 2 into the receptacle 3.

Please refer to FIG. 4, which is a schematic cross-sectional diagram illustrating the connection between the optical connector and the receptacle in the present invention. In this embodiment, the receptacle 3 includes a first side A and a second side B. The first side A and the second side B have at least one insertion hole 30a and 30b, respectively. The insertion hole 30a of the first side A corresponds to the insertion hole 30b of the second side B. In this embodiment, the first side A and the second side B have two insertion holes 30a and 30b, respectively. In the receptacle 3, the insertion holes 30a and 30b corresponding with each other have a coupling structure 31, and a via hole 310 is disposed in the coupling structure 31. An end of the coupling structure 31 protrudes toward the insertion hole 30a to be coupled with the terminal member 211 of the optical connector 2, so that the end portion E1 of the terminal member 211 is located at the side of the insertion hole 30b for coupling with an inserted optical connector (not shown). As shown in FIG. 4, when the optical connector 2 is suffered from an outward force 90 (e.g., the optical fiber cable 24 shown in FIG. 1 is pulled), an interaction force 91 is received by the pressing rod. Although the two forces are different in the axis, bending moment would be generated, but most structure of the pressing rod 237 is wrapped into the receptacle 3 and would not shake, so it would not be affected by external forces, and the stability is significantly increased.

Figure 5C:
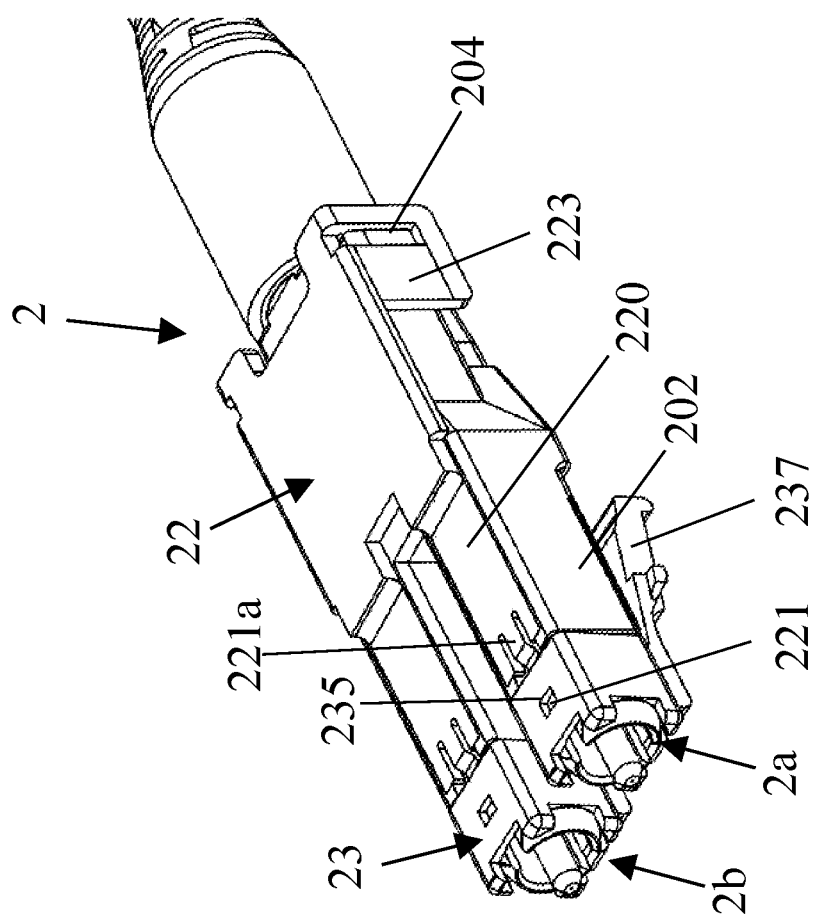

Please refer to FIGS. 5A to 5C, which are schematic diagrams of the polarity change of the optical connector in the present invention. In FIG. 5A, the optical connector 2 has a pair of sub-connectors 2a and 2b. In the state of FIG. 5A, the polarity adjusting portion 23 is located at the first position, that is, the pressing rod 237 is located on the side of the cover 22. Please refer to FIG. 5B, which illustrates a schematic cross-sectional diagram of one of the sub-connectors 2a. In this embodiment, there are two ways to change the polarity in the state of the optical connector shown in FIG. 5A. Taking the sub-connector 2a as an example, when the polarity adjusting portion 23 is located at the first position, the second buckle structure 230 is buckled with the first buckle structure 221. The first way to change the polarity is to apply an interaction force 92 to the first buckle structure 221 by a tool or a finger, so that the second buckle structure 230 is separated from the first buckle structure 221. After that, the polarity adjusting portion 23 may be rotated by a predetermined angle, which is 180 degrees in this embodiment, so that the third buckle structure 235 of the polarity adjusting portion 23 corresponds to the first buckle structure 221. When the interaction force 92 in FIG. 5B no longer acts on the first buckle structure 221, the supporting arm 221a brings the first buckle structure 221 back to the initial position, so that the third buckle structure 235 is buckled with the first buckle structure 221 to form the state shown in FIG. 5C, and the effect of changing the polarity is achieved.

The second way to change the polarity is to use the pressing rod 237 of the polarity adjusting portion 23. In this embodiment, through the interaction force 93 applied to the pressing rod 237, the pressing rod 237 drives the connecting body 237a to apply a force on the supporting arm 221a, so that the supporting arm 221a is deformed downward, and the second buckle structure 230 is separated from the first buckle structure 221. After that, the polarity adjusting portion 23 may be rotated by a predetermined angle, which is 180 degrees in this embodiment, so that the third buckle structure 235 of the polarity adjusting portion 23 corresponds to the first buckle structure 221. Since the interaction force 93 in FIG. 5B no longer acts on the first buckle structure 221, the supporting arm 221a brings the first buckle structure 221 back to the initial position, so that the third buckle structure 235 is buckled with the first buckle structure 221 to form a state as shown in FIG. 5C, and the effect of changing the polarity is achieved.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:
   an accommodation base, an opening disposed on a side of the accommodation base, which has an accommodation space connected to the opening and has at least one terminal accommodation portion;
   a terminal module, disposed in the terminal accommodation portion;
   a cover, disposed on the opening of the accommodation base to seal the opening, the cover having extending covers corresponding to the each terminal accommodation portion, an end of the extending cover having a first buckle structure; and
   a polarity adjusting portion, rotatably sleeved on a periphery of the terminal accommodation portion,
   wherein when the polarity adjusting portion rotates to a predetermined position, a second buckle structure disposed on the polarity adjusting portion is connected with the first buckle structure for positioning the polarity adjusting portion.

2. The optical connector of claim 1, wherein the terminal module comprises:
   an elastic member, disposed in the terminal accommodation portion, an end of the elastic member leaned against a wall surface of an end of the terminal accommodation portion; and
   a terminal member, disposed in the terminal accommodation portion, an end portion of the terminal member protruded from the terminal accommodation portion, and another end portion of the terminal member penetrated into the elastic member.

3. The optical connector of claim 1, wherein the accommodation base comprises a first assembly structure, the cover comprises a second assembly structure; when the cover is disposed on the opening, the second assembly structure is combined with the first assembly structure.

4. The optical connector of claim 3, wherein the terminal accommodation portions are a pair and are arranged in parallel with each other, a connecting structure is disposed between the terminal accommodation portions, and the first assembly structure is disposed on the connecting structure.

5. The optical connector of claim 4, wherein the cover has the second assembly structure, which is disposed between the extending cover corresponding to the terminal accommodation portion and protrudes toward the accommodation space.

6. The optical connector of claim 1, wherein two sides of the accommodation base respectively have a first engaging structure, and two sides of the cover have a second engaging structure; when the cover is set on the accommodation base, the first engaging structure is engaged with the second engaging structure.

7. The optical connector of claim 1, wherein the polarity adjusting portion comprises a third buckle structure; when the first buckle structure and the second buckle structure are released and the polarity adjusting portion is rotated by a predetermined angle, the third buckle structure buckles with the first buckle structure.

8. The optical connector of claim 1, wherein a pressing rod is extended from the polarity adjusting portion.

9. The optical connector of claim 8, wherein two sides of the pressing rod have a positioning structure.

10. The optical connector of claim 1, wherein the extending cover is connected to the first buckle structure by a supporting arm.

11. The optical connector of claim 1, wherein the cover, the extending cover, and the first buckle structure are integrally formed.

12. The optical connector of claim 1, wherein the accommodation base and the terminal accommodation portion are integrally formed.

\* \* \* \* \*